Figure 1:
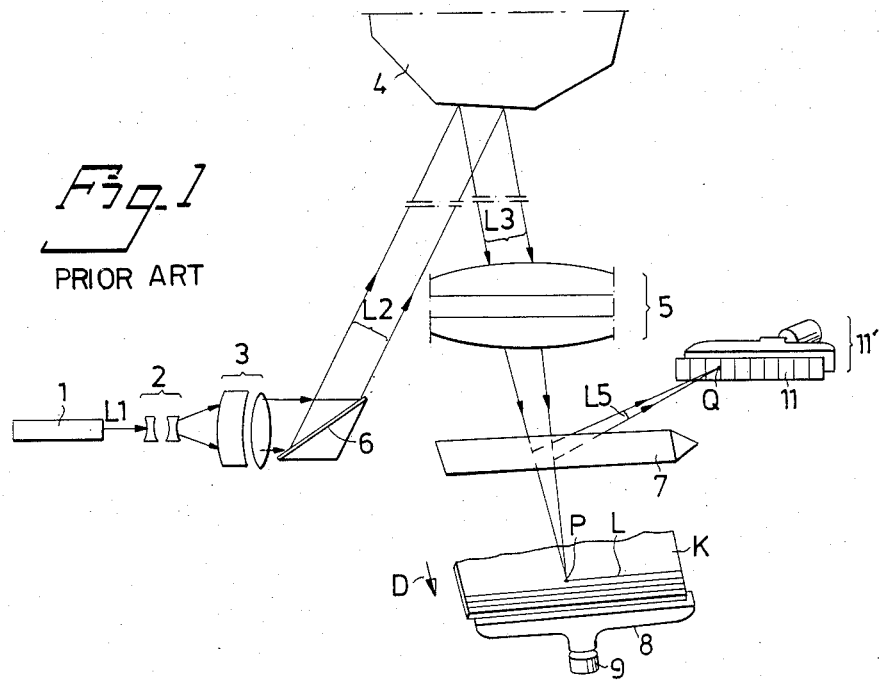

United States Patent [19]
Åsemyr

[11] Patent Number: 4,629,885
[45] Date of Patent: Dec. 16, 1986

[54] SCANNING APPARATUS

[75] Inventor: Nils G. Åsemyr, Onsala, Sweden

[73] Assignee: Semyre Electronics AB, Frolunda, Sweden

[21] Appl. No.: 575,582

[22] Filed: Jan. 31, 1984

[30] Foreign Application Priority Data

Jan. 31, 1983 [SE] Sweden ............................... 8300480

[51] Int. Cl.$^4$ ............................................... H01J 3/14
[52] U.S. Cl. ..................................... 250/235; 350/6.8
[58] Field of Search ............... 250/216, 234, 235, 236; 350/6.7, 6.8, 6.9, 6.91; 358/293, 292, 294

[56] References Cited
U.S. PATENT DOCUMENTS

| | | | |
|---|---|---|---|
| 4,241,257 | 12/1980 | Koester | 250/235 |
| 4,266,876 | 5/1981 | Nakazawa et al. | 250/236 |
| 4,274,703 | 6/1981 | Fisli | 350/6.8 |

OTHER PUBLICATIONS

"A System for Automatic Visual Inspection of Printed Circuit Boards" by Antonnson et al., Jan. 16, 1979, pp. 1-22.

*Primary Examiner*—David C. Nelms
*Attorney, Agent, or Firm*—Banner, Birch, McKie & Beckett

[57] ABSTRACT

A scanning apparatus with large resolution capacity utilizes a laser means as a light source (1), the light beam (L1) of which is deflected such as to substantially follow the optical axis of an f-$\theta$ lens (5) after having passed a diverging lens (2). A rotating polygon mirror or spinner (4) is disposed on the opposite side of the f-$\theta$ lens (5), such that a reflected sweeping beam is obtained. This sweeping beam is allowed to pass once again through the f-$\theta$ lens (5) and is divided in beam dividers (7,10) for generating a sweeping scanning beam (L3) and a reference beam (L5). The dots (P, Q) formed by the scanning and reference beams (L3, L5) sweep muturally simultaneous, the dot (Q) of the reference beam being utilized to define, with the aid of a clock pulse scale (11), the exact position of the scanning beam dot (P) on a scanned object (K).

6 Claims, 5 Drawing Figures

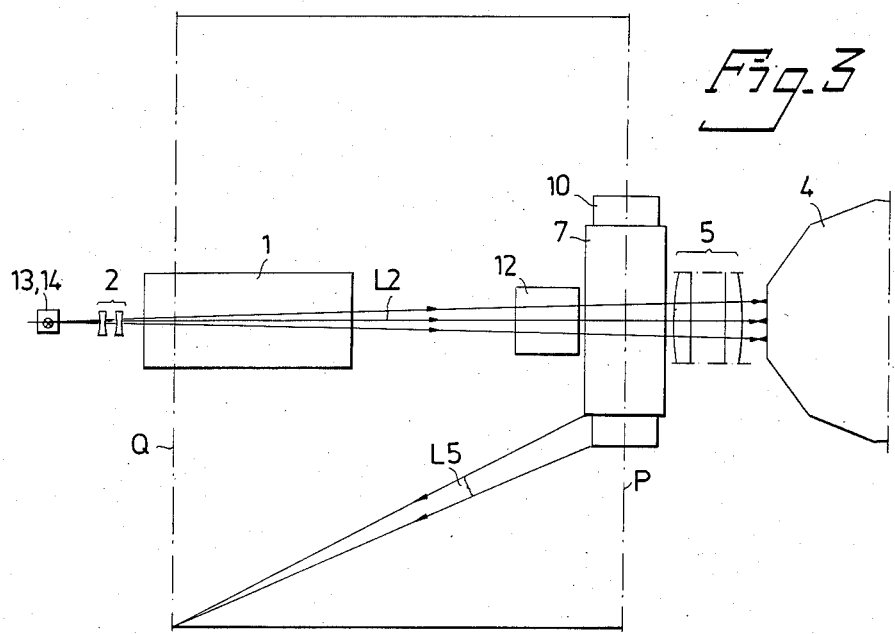
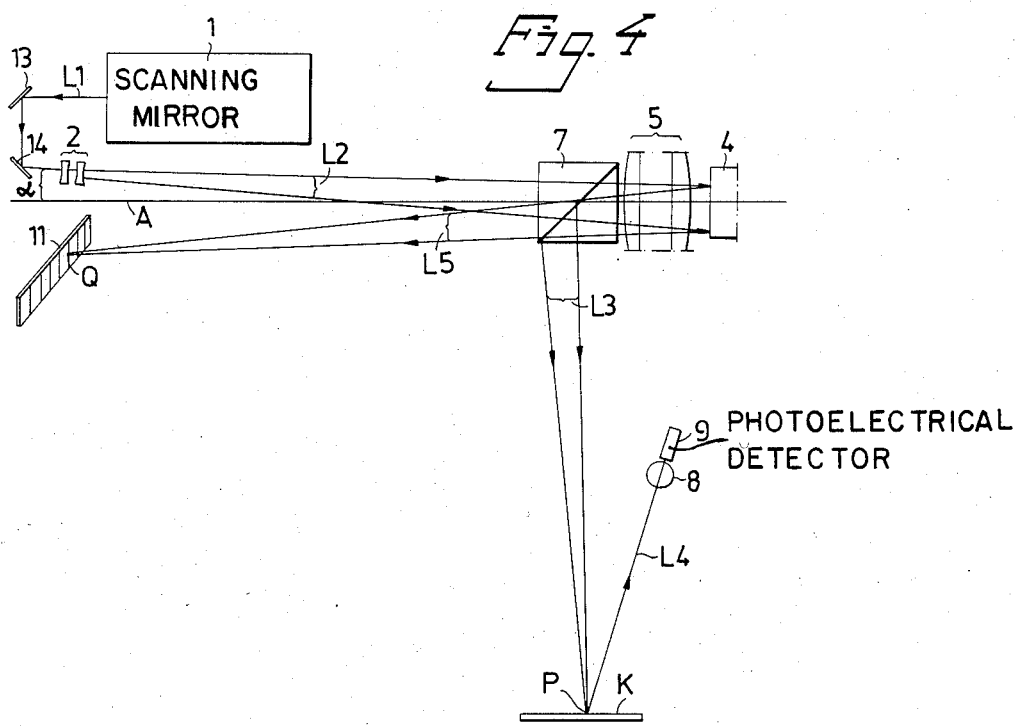

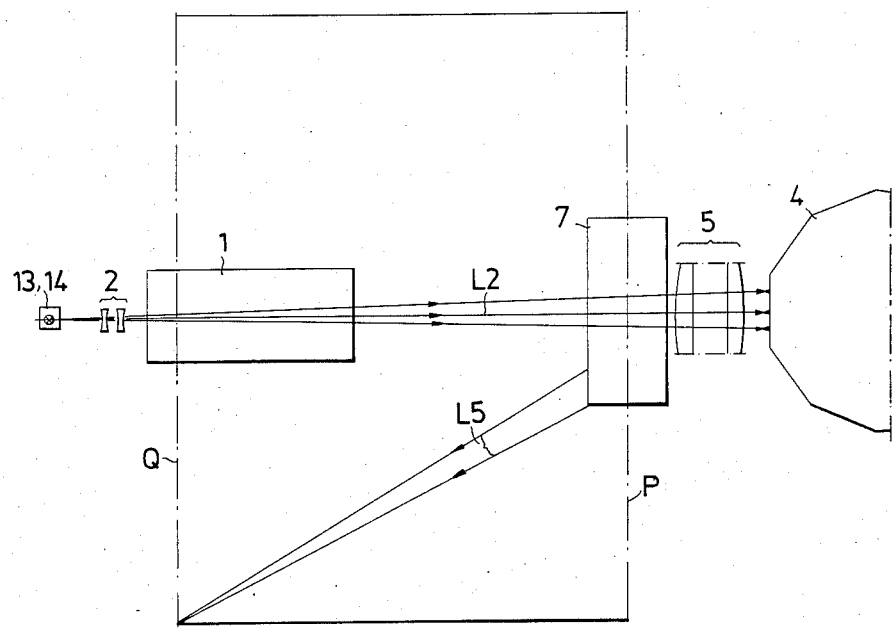

SCANNING APPARATUS

The present invention relates to scanning apparatus having great resolution ability for scanning a picture plane on which small details are to be detected. Such details may be in the form of circuit patterns on printed boards or thick film circuits, dots and lines or other characters in photographic typography, or distance measurements in two-dimensional pictures. The scanning apparatus in accordance with the invention includes a light source for transmitting a substantially parallel, narrow light beam directed towards a moving scanning mirror, the light beam being adapted to follow an optical path including a diverging lens and a positive lens for sweeping over the the picture plane as a dot along a repetitive scanning line.

In scanning apparatus of the kind intended here, a laser has normally been utilized as a light source, from which the emanating light beam is directed towards a diverging lens arranged on the same optical axis as a collimator lens, which sends a light beam composed of parallel rays towards a rotating polygon mirror such as to cause the parallel light beam to pass through the positive lens at different angles of entry. The light beam reflected from the polygon mirror is converged after passage through the positive lens to form a light dot, which sweeps along the scanning path as many times per revolution of the polygon mirror as the number of reflecting surfaces this mirror has.

In such known scanning apparatus (see also FIG. 1, which is described below) there are relatively large distances between the rotating polygon mirror and adjacent lens system, resulting in that the surfaces of both mirror and lenses must have substantial width. Such large optical elements are expensive and difficult to manufacture.

In accordance with the invention, by arranging the diverging lens, in scanning apparatus of the kind mentioned above, at an optic axis common to the positive lens and the moving scanning mirror, at which axis also a beam splitter is arranged, and in such a way that said beam splitter and said positive lens are inserted between said diverging lens and said scanning mirror and that said positive lens is arranged between said beam splitter and said scanning mirror to transfer the light beam directed onto said scanning mirror as well as the light beam reflected therefrom through both said positive lens and said beam splitter, said beam splitter directing the reflected light onto said picture plane, the disadvantages mentioned hereinbefore have been overcome. Furthermore, removal of the positive element of the diverging lens has been enabled, while at the same time reduction of the positive lens diameter and the size of the scanning mirror reflecting surfaces has been enabled.

The positive lens is to advantage an f-$\theta$ lens.

It has thus been possible to provide a scanning apparatus, both technically and economically well suited for use in scanning systems of the kind described in the introduction. However, these are merely examples of the range of uses, and therefore the inventive scanning apparatus is not to be regarded as limited to them, and it well answers the purpose as a so-called line scanner for all fields of use requiring large resolution. Using a further development of the scanning apparatus in accordance with the invention, positional determination of individual details in the field of view is thus enabled, by parts of the reflected light beam being utilized as a reference or clock beam. The beam may be caused, for example, to sweep over a scale divided into distinct reference areas, where each such area gives rise to a signal, which indicates the exact position of the scanning ray, and which can also be compared with information previously stored in a memory. Electronic circuits for evaluating the optically obtained scanning values are known, e.g. from the Swedish Pat. Nos. 405 050, 409 467 and 412 966. Such circuits are also described in the research report LITH-ISY-I-264 with the title "A System for Automatic Visual Inspection of Printed Circuit Boards" by D. Antonsson et al, the University of Linköping 1979-01-16.

Figure 2:
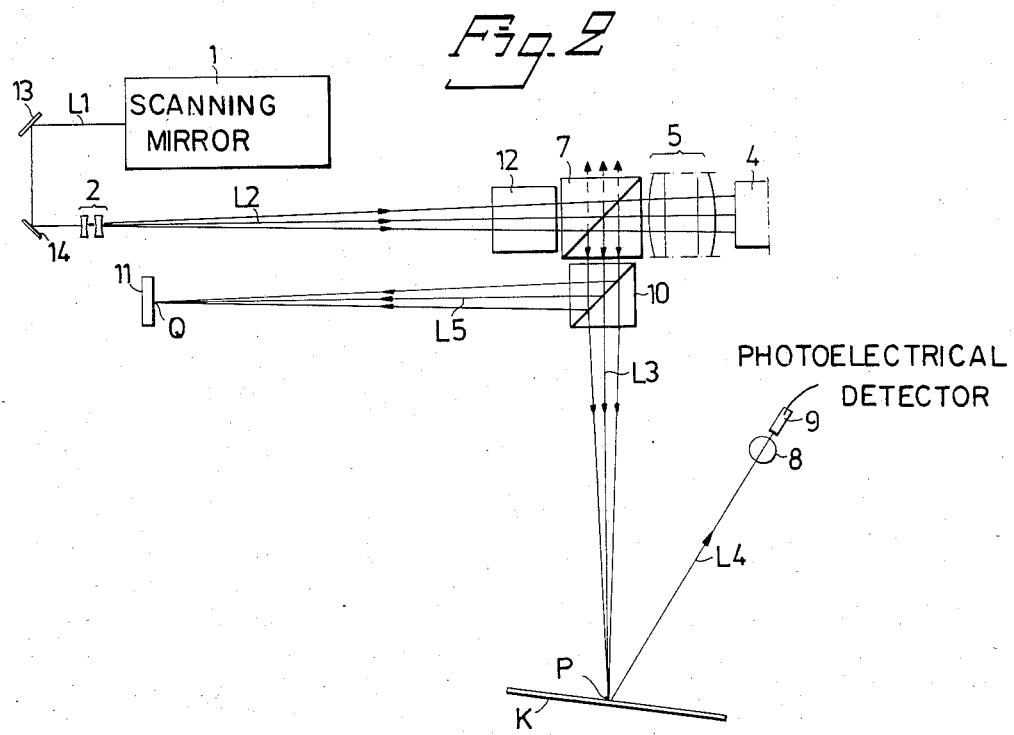

The inventive scanning apparatus will now be described in detail below, starting from a previously proposed apparatus, and with reference to the appended drawings, where FIG. 1 illustrates the principle of a previously proposed scanning apparatus, FIG. 2 is a side view of the ray path in a first embodiment of the inventive scanning apparatus, FIG. 3 is a view from above of the apparatus illustrated in FIG. 2., and FIGS. 4 and 5 are views corresponding to FIGS. 2 and 3 of a preferred embodiment of the inventive scanning apparatus, FIG. 4 schematically indicating the use of the invention in conjunction with inspection of printed circuit boards (PCB's).

The principle is illustrated in FIG. 1 for the ray path in a proposed scanning apparatus, schematically illustrated for inspecting a PCB denoted K. A laser device is used as light source 1, its emanating beam L1 directed onto a diverging lens 2 and after passing through a collimation lens 3 and being reflected by an inclined mirror 6 it strikes as a wide parallel light beam L2, a rotating polygon mirror or spinner 4. In the embodiment illustrated here the spinner 4 has twelve facet segments, whereby the reflecting beam L3 is given in a manner known per se a sweeping movement when the spinner 4 rotates. The reflected, sweeping beam L3 substantially comprises the same parallel ray path as the light beam L2 and is directed onto an f-$\theta$ lens 5. This lens 5 converges the sweeping beam L3 to a dot P, which will move along a line L over the PCB K. In turn, PCB is stepwise advanced in the direction of the arrow D, the entire surface of the board thus being scannable by repeated sweeping of the beam L3.

It is intended to examine the positions for possible openings in the PCB K with the proposed scanning apparatus. For such an opening, the beam L3 passes through the PCB and is caught by a light receiver under it, comprising fibre optics 8 and a photomultiplier 9. To achieve correct positional determination, the beam L3 is caused to pass through a beam dividing prism 7, which has a transmission/reflection ratio of 90/10%. the reflected beam L5 thus forms a light dot Q on a clock pulse scale 11, which generates an electrical reference signal via the fibre optics and photomultiplier means 11'. An electrical signal from the photomultiplier 9 indicates an opening in the PCB, and the position for this opening is determined by the position which the dot Q then takes up on the clock pulse scale 11.

As already described in the introduction to this description, a known apparatus of this kind has some troublesome disadvantages. A vital object of the present invention is to overcome with these disadvantages, particularly to minimize the surface of the scanning light dot P, e.g. so that extremely small ruptures in the conductors on the PCB will be scannable, since such ruptures may have a devastating effect on the circuit function.

To achieve an improved scanning apparatus it has been found that both the emanating light beam L1 and the reflected light beam L3 must pass through the F-θ lens 5. This situation is thus basic to the present invention, which can then be realized in different ways.

An inventive scanning apparatus with which it is easy to obtain small diameters for the dot P in practice is illustrated in FIGS. 2 and 3. In this embodiment of the invention, the light source 1 is adapted such that its emanating light beam L1 is parallel to the diverging beam L2 directed towards the lens 5. The diverging beam L2 is applied centrally to the lens 5, which similarly transmits the formed parallel beam concentric with the lens axis towards the spinner 4.

The parallel beam reflected by the spinner 4 will of course be similarly applied centrally to the lens 5. In order to achieve an effective sweeping beam L3, the dot P of which is to sweep over the picture plane K, a beam-dividing prism 7 has been disposed in the ray of the diverging beam L2 applied to the lens 5 as well as for the sweeping beam L3 departing from the lens. The beam-dividing prism 7 is implemented in the form of two triangular prisms cemented to each other, and having a transmission/reflection ratio of 50/50%, for example. The incident diverging beam L2 will thus be reflected up to 50% (upwards according to FIG. 2) and up to 50% will pass through the lens 5. The reflected part is not utilized. In a corresponding manner, the sweeping beam L3 coming from the lens will be reflected (downwards according up to FIG. 2) to 50% and will pass straight through up to 50%. In this case the reflected part is utilized, however, and has been allowed to keep the reference denotation L3, while the part of the beam passing through the prism is not utilized.

The utilized part of the sweeping beam L3 thus goes at right angles downwards towards the picture plane where the formed dot P sweeps forward, e.g. over a printed circuit board K, which is to be inspected. To enable evaluation of the status of the PCB a measuring beam L4 reflected from it is utilized. To enable evaluation of the measuring beam L4, its reflection must take place away from the sweeping beam L3, and this has been arranged by the surface of the PCB K forming an angle to the line of the incident sweeping beam L3. The measuring beam L4 is caught, in a manner proposed previously, by fibre optics 8, coupled to a photocell, photomultiplier or photodiode 9 to obtain electrical instant values which may be fed to a computer (not shown).

So that the computer will also obtain the pertinent criterion value, a further beam dividing prism 10 has been inserted, namely in the ray path for the part of the sweeping beam L3 which is utilized. As with the beam dividing prism 7 already mentioned, this further beam dividing prism 10 consists of two triangular prisms cemented to each other. These prisms have a transmission/reflection ratio, e.g. of 90/10%, since it is desirable to utilize the greatest possible quantity of light from the sweeping beam L3 to obtain a measurable measuring beam L4, while the deflected reference beam L5 does not need to be particularly light-intensive to obtain a positionally determining reference signal.

The positionally determining reference signal is obtained in a manner previously proposed, by the deflected reference beam L5 being allowed to strike a clock pulse scale 11, divided into different areas over which the reference beam L5 sweeps. By allowing a computer continuously to register the position of the reference beam L5 on the clock pulse scale 11 there is obtained a possibility of determining the exact position of the sweeping beam L3 on the PCB K. Accordingly, electrical signals corresponding to the beams L4 and L5 may be fed to a computer (not shown) and the resulting output signal from the computer can be subsequently utilized in a desired manner. However, this is no part of the present invention and will therefore not be accounted for in further detail here.

To obtain complete symmetry in all the ray paths, and thereby counteract undesireable spherical aberration, a compensation prism 12 may be inserted in the ray path between the diverging lens 2 and the beam-dividing prism 7. Beam incidence on the diverging lens 2 from the light source 1 takes place via two mirrors 13, 14.

In trials with the embodiment illustrated in FIGS. 2 and 3, a He-Ne laser with a power of 6 mW has been used as a light source for scanning circuit boards. The spinner used has a radius of 100 mm and ten mirror surfaces. The length of the sweeping line for the dot P as well as the dot Q of the reference beam L5 was 500 mm, while the printed circuit board K was advanced stepwise. An extremely good inspection result was obtained, the output signal from the computer being utilized for test recording via a computer. The diameters of the dots P, Q were approximately 18μ.

A modified embodiment according to FIGS. 4 and 5 may be used in order to reduce the required optics for the embodiment discussed above in connection with FIGS. 2 and 3, and without any great renunciation of accuracy in the scanning apparatus. The manufacturing cost is reduced by the simpler optics, but the diameter of the dots P, Q may still be kept at 18–20μ.

As with the embodiments according to FIGS. 2 and 3, the light source 1 is arranged such that the light L1 transmitted is parallel to the optical axis A of the F-θ lens 5. Distinguishing from the apparatus according to FIGS. 2 and 3, the mirrors 13, 14 in the modified embodiment are angled such that the light beam L2 forms an acute angle α to the axis A. The light beam L2 incident on the beam-dividing prism 7 will thus be somewhat displaced from the centre, which also applies to the parallel beam projected onto the spinner 4. The parallel beam reflected from the spinner 4 which is converged by the f-θ lens 5, will be divided into a sweeping beam L3 and a reference beam L5 by the prism 7. In this modified embodiment there is thus utilized the passing and the reflected parts of the beam reflected from the spinner 4. The transmission/reflection ratio for the beam-dividing prism 7 is here suitably selected to be 50/50%.

Since the beam L2 forms an angle α to the optical axis A, the reference beam L5 will also form the same angle to the axis A, but on the opposite side of the axis. The clock pulse scale 11 can thus be arranged in the immediate vicinity of the axis A. The area division of the clock pulse scale 11 is indicated in FIG. 4.

In the same way as the light beam L2 and reference beam L5 each form an angle α to the optical axis A, the reflected part of the sweeping beam L3 will form the corresponding angle to an axis intersecting the axis A at right angles. If the printed circuit board K is displaced along a path parallel to the axis A, a measuring beam L4 reflected at an angle α is automatically obtained towards the fibre optics 8 and the photodiode 9.

The modified embodiment according to FIGS. 4 and 5 otherwise has the same function as the embodiment discussed in conjunction with FIGS. 2 and 3.

Although some preferred embodiments have been described above in conjunction with the accompanying drawings, this is not to be regarded as restricting the invention, since different modifications can be carried out without departing from the inventive concept. Such a modification can be made by exclusion of the prisms 10 and 12 shown in FIG. 2 when the f-$\nu$ lens 5 is a very high standard lens. Then the clock pulse scale 11 will be replaced by fixed clock source. The fixed clock source pulses are used in a manner corresponding to the one described in connection with the pulses from the clock pulse scale 11. The scanning apparatus has been exemplified to a certain extent by being applied to a method of inspecting printed circuit boards, but it is intended to be used for all scanning purposes where great accuracy is of importance.

I claim:

1. Scanning apparatus with large resolution capacity for scanning a picture plane (K) having small details which are to be detected, the apparatus including a light source (1) for transmitting a substantial parallel, narrow light beam (L1) directed toward a movable scanning mirror (4), said light beam following an optical ray path including a diverging lens (2) and a positive lens (5) for scanning said picture plane as a sweeping light dot along a repetitive sweeping line, characterized in that said diverging lens (2) is disposed at an optic axis common to said positive lens (5) and to said movable scanning mirror (4), also a beam divider (7) is arranged at said optic axis, said beam divider (7) and said positive lens (5) being inserted between said diverging lens (2) and said scanning mirror (4), and said positive lens (5) being arranged between said beam divider (7) and said scanning mirror (4) to transfer the light beam (L2) directed onto said scanning mirror as well as the light beam (L3, L5) reflected from said scanning mirror through both said positive lens (5) and said beam divider (7), said beam divider (7) directing the reflected light onto said picture plane (K).

2. Apparatus as claimed in claim 1, characterized in that said diverging lens (2) is arranged at said optic axis (A), a reference beam divider (10) is arranged between said beam divider (7) and the picture plane (K) for reflecting towards a clock pulse scale (11) a partial beam of the beam (L3) directed towards said picture plane, said partial beam bein intended as a reference beam (L5), and in that an equalizing prism (12) is arranged in the ray path between said diverging lens (2) and said beam divider (7).

3. Apparatus as claimed in claim 2, characterized in that said diverging lens (2) is displaced by a predetermined amount from said optical axis (A) and in that said beam divider (7), arranged between said diverging and said positive lens, sends a scanning beam (L3) directed toward said picture plane (K) and said partial beam utilized as a reference beam (L5), said reference beam being displaced by said amount from, but on the opposite side of, said optical axis (A) relative to said diverging lens (2) and directed onto said clock pulse scale (11).

4. Apparatus as claimed in claim 1, characterized in that a light beam (L4) reflected from the sweeping line (L) of said picture plane (K) is adapted to sweep along a light conductor (8) including optical fibres, the light transmission of which is sensed with a photoelectrical detector (9) such as to transmit electrical pulses corresponding thereto and adapted for being supplied to a computer for comparison with reference pulses generated by said ciock pulse scale (11) activated by the reference beam (L5) and supplied to the computer.

5. Apparatus as claimed in claim 4, characterized in that said reference beam (L5) is adapted for sweeping over said clock pulse scale (11) divided into distinct areas for determining the position of said light beam (L3) reflected from said sweeping line dot of said picture plane (K).

6. Apparatus as claimed in claim 1, characterized in that the positive lens (5) is an f-θ lens.

* * * * *